March 3, 1931.  H. GARNER  1,795,208
BODY OF MOTOR ROAD VEHICLE
Filed July 17, 1929   2 Sheets-Sheet 1
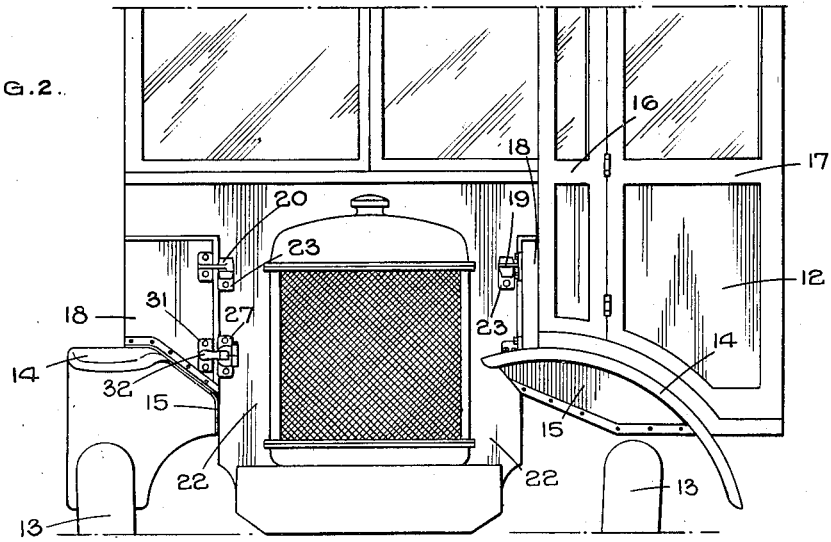
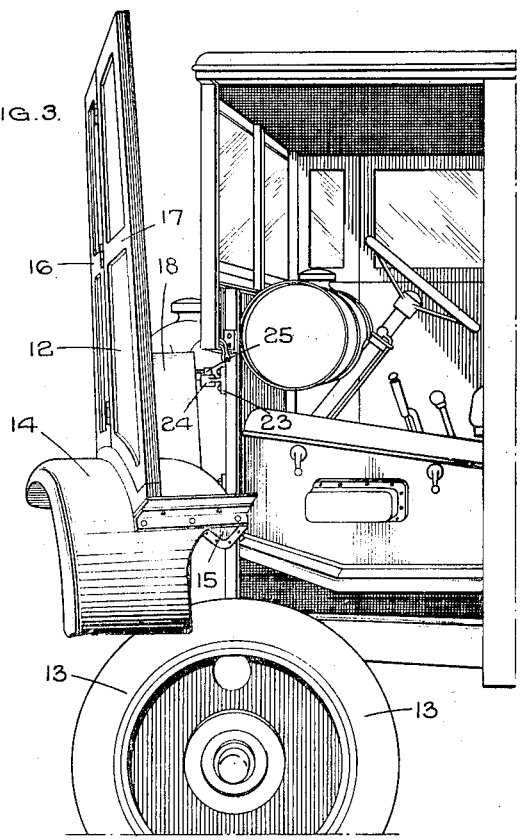
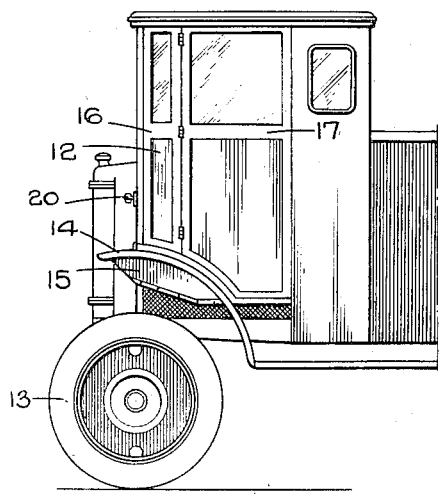
INVENTOR
Henry Garner
BY
ATTORNEYS March 3, 1931. H. GARNER 1,795,208
BODY OF MOTOR ROAD VEHICLE
Filed July 17, 1929 2 Sheets-Sheet 2
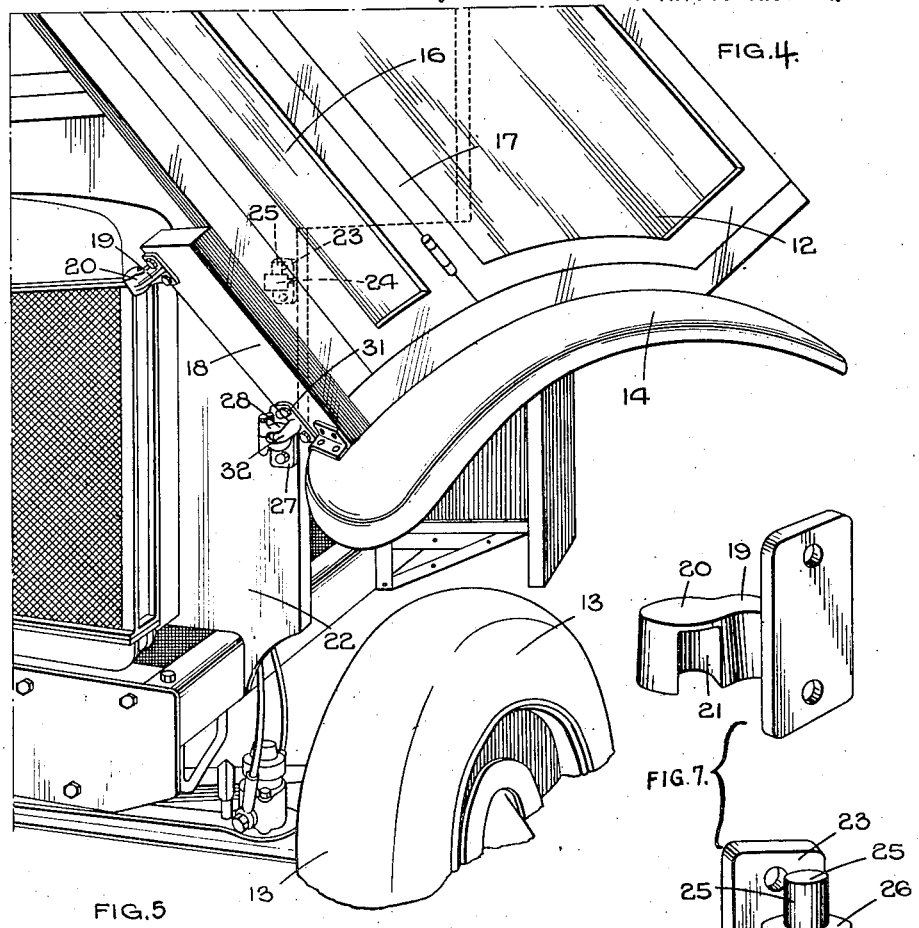
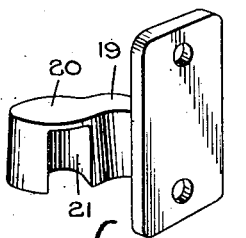
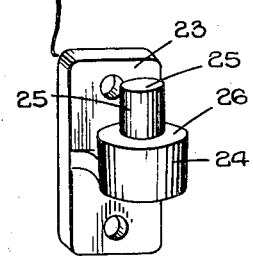
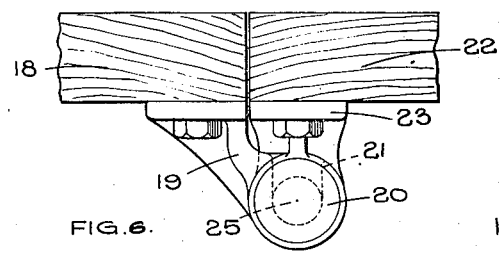
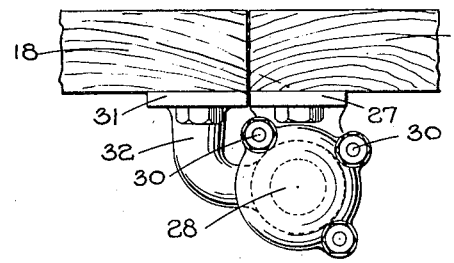
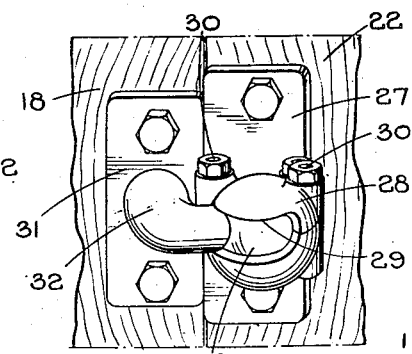
INVENTOR
Henry Garner
BY
ATTORNEYS Patented Mar. 3, 1931

1,795,208

UNITED STATES PATENT OFFICE

HENRY GARNER, OF MOSELEY, BIRMINGHAM, ENGLAND

BODY OF MOTOR ROAD VEHICLE

Application filed July 17, 1929, Serial No. 379,023, and in Great Britain July 17, 1928.

This invention relates to the bodies of motor road vehicles and refers more particularly to that type of vehicle which is sometimes known as an "overtype", wherein a seat is provided for the driver, and in some cases additional seats for attendants or passengers, at the side or above the engine with the object of obtaining increased space for load carrying and also with the object of obtaining a better load distribution upon the axles.

A disadvantage resulting from the overtype arrangement of body is that accessibility to the engine for adjustments is rendered difficult and usually involves the necessity of the driver groping on the floor of the driver's cab or compartment to obtain access to the upper part of the engine, while access to the lower part of the engine is a matter of still greater difficulty.

By "driver's cab" I intend to include such parts as the dash board and the flooring, and parts carried thereby such as the mudguard and valance.

In order to overcome this difficulty I have suggested in my prior British specification No. 233,545 that a portion of the driver's cab or the front portion of the body shall be movable to allow a free access to the engine.

In the arrangement specifically described in my prior specification the outer part of the driver's cab at one or both sides and including the extremities of the dashboard is hinged on a vertical axis so that it can be swung outwardly to give access to the engine.

In a convenient arrangement the swinging portion may include a front mudguard and a part of the flooring of the cab.

When the swinging part includes the mudguard and a part of the flooring however the arrangement is only applicable provided the flooring is above the level of the top of the wheel.

The present invention has for its primary object to provide an arrangement wherein the swinging part may include a part of the flooring and/or the mudguard or associated parts even although it or they are on a lower level than the top of the wheel.

Referring to the drawings:—

Figure 1 is a view in side elevation showing a movable unit in its closed position.

Figure 2 is a front view thereof.

Figure 3 is a perspective view thereof showing the moving unit swung forwardly.

Figure 4 is a perspective view showing the moving unit swung forwardly and tilted.

Figure 5 is a plan view showing one of the hinges.

Figure 6 is a plan view showing the ball joint.

Figure 7 is a perspective view showing the two parts of the hinge illustrated in Figure 5.

Figure 8 is a perspective view showing the ball joint illustrated in Figure 6.

In the construction shown when the vehicle is evenly loaded and standing on level ground the whole of the swinging unit 12 is above the top of the wheel 13 but it is to be understood that with uneven loading or upon uneven ground the wheel 13 may occupy a much higher position relative to the mudguard 14 than that shown in Figure 1 so that in order to swing out the movable unit 12 it is necessary to provide a tilting action as well as a horizontal swinging movement.

In this construction the movable unit consists of a mudguard 14 with valance 15, forward side panel 16, a door 17, and a front panel 18.

Further, this movable unit is duplicated each side of the vehicle.

The front panel 18 is provided with a bracket 19 having an inverted cup shaped portion 20 which is slotted at 21 as shown in Figure 7.

On the fixed part 22 with the dashboard is provided a bracket 23 having a flanged pin like portion 24 the upper part of which is formed as a pivot pin 25 and the lower part of which has a shoulder 26.

When the swinging unit is in its closed position the pin portion 25 is engaged by the portion 20 of the bracket 19 but the slot 21 permits the portion 20 of the bracket 19 to leave the pin 25 when it is desired to tilt the swinging unit.

The front panel 18 is further connected to the fixed part 22 of the dashboard by means of a ball joint illustrated clearly in Figures 4, 6, and 8.

On the fixed part 22 of the dashboard is a bracket 27 having a two part spherical casing 28 in which is a horizontal slot 29. The two parts of the casing 28 are secured together by bolts 30.

On the front panel 18 of the swinging unit is a bracket 31 having a curved arm 32 terminating in a ball 33 which is located within the spherical housing 28.

When the movable unit is swung outwardly upon a vertical axis corresponding with the axis of the pin 25 the arm 32 can move round in the slot 29. The movable unit can, however, be tilted forwardly to bring the mudguard 14 and valance 15 over the wheel 13 by tilting upon the ball 33 as shown clearly in Figure 4.

Suitable fastenings may be provided for retaining the movable unit in the position shown in Figure 1.

I wish it understood that vairous changes in form, proportions and minor details of construction may be resorted to within the scope of the appended claims, and that I do not wish to limit myself to the specific design and construction here shown.

What I claim then is:—

1. In a vehicle body a driver's cab located over the engine, a unit at the side of the cab including a side panel, a mudguard and a portion of the floor, a permanent ball and socket connection between said unit and the main structure and a further hinge connecting the unit to the main structure, the parts of the additional hinge being separable by moving them laterally with respect to each other whereby the parts of the additional hinge will be disengaged upon the unit being tilted forwardly about the ball and socket connection, the unit being then free to be swung outwardly clear of the wheel or other obstruction so as to give free access to the engine.

2. In a vehicle body, a driver's cab located over the engine, a unit at the side of the cab including a side panel, a mudguard and a portion of the floor, a spherical socket upon the main structure and a ball carried by an arm for engaging said socket and situated upon said unit, the ball and socket connection being near the lower end of said unit, a hinge connecting the upper end of said unit to the main structure, the one part of the hinge being in the form of an upright pin, the opposite part being in the form of a boss having a lateral slot for receiving the pin, the parts of the upper hinge being separable by pivotally moving the unit about the ball and socket connection, the unit being then free to be swung outwardly clear of the wheel, or other obstruction so as to give free access to the engine.

In witness whereof I affix my signature.

HENRY GARNER.